(12) United States Patent
Maleyran et al.

(10) Patent No.: US 8,339,105 B2
(45) Date of Patent: Dec. 25, 2012

(54) POWER MANAGEMENT ARRANGEMENT FOR A MOBILE DEVICE

(75) Inventors: Marianne Maleyran, Saubens (FR); Bertrand Clou, Toulouse (FR)

(73) Assignee: Freescale Semiconductor, Inc., Austin, TX (US)

( * ) Notice: Subject to any disclaimer, the term of this patent is extended or adjusted under 35 U.S.C. 154(b) by 430 days.

(21) Appl. No.: 12/682,452

(22) PCT Filed: Oct. 17, 2007

(86) PCT No.: PCT/IB2007/055374
§ 371 (c)(1),
(2), (4) Date: Apr. 9, 2010

(87) PCT Pub. No.: WO2009/050542
PCT Pub. Date: Apr. 23, 2009

(65) Prior Publication Data
US 2010/0237696 A1    Sep. 23, 2010

(51) Int. Cl.
*H02J 7/00* (2006.01)
(52) U.S. Cl. .................. 320/138; 320/137
(58) Field of Classification Search .............. 320/138, 320/137, 119, 124, 125, 126
See application file for complete search history.

(56) References Cited

U.S. PATENT DOCUMENTS

| | | | |
|---|---|---|---|
| 5,721,933 A * | 2/1998 | Walsh et al. | 713/300 |
| 6,242,892 B1 | 6/2001 | Arnaud et al. | |
| 7,100,058 B1 * | 8/2006 | Tomlinson et al. | 713/300 |
| 2005/0253560 A1 | 11/2005 | Popescu-Stanesti et al. | |
| 2009/0115384 A1 * | 5/2009 | Venes et al. | 323/280 |

FOREIGN PATENT DOCUMENTS

| | | |
|---|---|---|
| WO | 03/014902 A | 2/2003 |
| WO | 2006/102928 A1 | 10/2006 |

OTHER PUBLICATIONS

International Search Report and Written Opinion correlating to PCT/IB2007/055374 dated Feb. 19, 2009.

* cited by examiner

*Primary Examiner* — Edward Tso
*Assistant Examiner* — Amir H Etesam

(57) ABSTRACT

A power management arrangement for a mobile device comprising a digital circuit block and an analog circuit block, the power management arrangement being arranged to supply a first voltage to the analog circuit and a second voltage to the digital circuit, the power management arrangement comprising: an input unit adapted to receive input voltages from a plurality of power sources; a first voltage regulator coupled to the input unit and for supplying the first voltage; a second voltage regulator for supplying the second voltage and arranged to be selectively coupled to one of the first voltage regulator and input unit; and control logic adapted to select which of the received input voltages from the plurality of power sources provides power to the first and second voltage regulators, and to determine the magnitude of the first and second voltages supplied by the first and second voltage regulators.

20 Claims, 8 Drawing Sheets

POWER MANAGEMENT ARRANGEMENT FOR A MOBILE DEVICE

FIELD OF THE DISCLOSURE

This disclosure relates to a power management arrangement for a mobile device arranged to receive power from a plurality of sources. The disclosure also relates to a mobile device including the power management arrangement.

BACKGROUND

Mobile devices, such as mobile phones, personal organisers and portable music players are usually powered by an internal rechargeable battery. These devices may be recharged using a mains or in-car battery charger. During charging the device can be powered from the mains or car battery instead of the internal battery. Often these mobile devices are also equipped with a secondary battery such that if the main battery fails or is removed from the mobile device, the secondary battery provides power to maintain internal settings and information (such as maintaining power to clock functions). This avoids the user the inconvenience of having to re-enter important information each time the main battery is removed or discharged.

Recently, some mobile devices have also incorporated USB connections or the like, which can also be used to supply power to the device or recharge the battery.

It is desirable that the mobile device optimises use of the internal rechargeable battery to increase the life of the battery and provide the user with an operational device for as much of the time as possible.

The USB connection, mains charger, and in-car charger can be considered as external power sources. Prior art devices treat the external power sources separately which leads to the device having several system supply circuits with duplicate functions. For example, the input node for receiving each supply will have voltage and current references, comparators, and regulators, which may all be arranged to handle high currents.

In one prior art implementation, shown in FIG. 1, a power management circuit 10 can be connected to a USB charger 20, wall charger 22, main battery 24 and secondary battery 26 (also referred to as button cell or backup battery). Various components 38 such as memory units and the real time clock system are connected to the main battery 24 or alternatively to the secondary battery 26 through a selector 40. The selector is arranged to connect the memory units and real time clock system to whichever of the main battery or secondary battery provides the higher voltage. However, this arrangement shortens the life of the secondary battery 26 as it can be forced to supply power to the various components 38 even if other power sources, e.g. USB or wall charger, can supply power to these components. Core circuits 36 (i.e. circuits other than the charging circuits 30 and those connected to selector 40) are connected directly to the power management circuit 10.

In WO 2006/102928 an improved prior art power management scheme is proposed. The power management scheme, as shown in FIG. 2, is able to receive power from four power sources: USB charger 20, wall charger 22, main battery 24, and secondary battery 26. The output of the power management circuit provides power through a main output voltage, Vcore, to the other components of the mobile device, such as the display, LED matrix, digital and analog circuits etc. The power management circuit includes a power source capabilities detection unit, a power source selection unit, and a regulator circuit. The regulator circuit has multiple inputs and a single output. The power source detection unit monitors the available power sources to determine their power supply capability. If a power source can supply voltage above a threshold level, then it will send an indication to the power source selection unit. The power source selection unit applies selection rules to determine which power source supplies power, as indicated in Tables 1 and 2 below.

TABLE 1

TRUTH TABLE IN ON MODE

| CHARGER | VBUS | BATTERY | Back-up cell | Vcore powered by |
|---------|------|---------|--------------|------------------|
| X | X | 1 | X | BATTERY |
| 1 | X | 0 | X | CHARGER |
| 0 | 1 | 0 | X | VBUS |

TABLE 2

TRUTH TABLE IN OFF MODE

| CHARGER | VBUS | BATTERY | Back-up cell | Vcore powered by |
|---------|------|---------|--------------|------------------|
| 1 | X | X | X | CHARGER |
| 0 | 1 | X | X | VBUS |
| 0 | 0 | Highest | | BATTERY |
| 0 | 0 | | Highest | Back-up Cell |

The selection rules are used to determine which power source supplies power based on the amount of current or voltage available from a source and the status of the mobile device. In the tables above, "0" indicates that the power source is not present, "1" indicates that the power source is selected to provide power, and "X" indicates that the value or status of a power source is not relevant. Therefore, the tables indicate that in the "On" mode with the main battery able to supply power, power will always be drawn from the main battery. In the "Off" mode with the wall charger 22 present, power is always drawn from the charger. In the "Off" mode with only the main battery 24, and secondary battery 26 present, power will be drawn from whichever of these two batteries has the highest voltage.

This prior art arrangement has a number of disadvantages as the input nodes for the USB charger and wall charger each have voltage references for detection of the charger. This arrangement of reference voltages etc for each voltage input takes up significant area on the semiconductor device used to implement the power management scheme. In addition, Vcore also requires a reference voltage, this is provided by a trimmed bandgap reference to get good supply accuracy. This takes up further room on the chip and is an additional power consuming component.

Furthermore, the various components mentioned above (e.g. display, LED matrix, digital and analog circuits etc) are all powered from a single voltage rail Vcore which supplies all of the analog and digital circuits. The magnitude of Vcore is required to be relatively large to power the analog circuits.

There is therefore a need to provide an improved power management arrangement that meets the requirements of providing core voltage but also minimises power consumption and optimises die area.

SUMMARY

The present invention provides a power management arrangement for a mobile device, and a mobile device including the power management arrangement as described in the accompanying claims.

Specific embodiments are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings

DETAILED DESCRIPTION

Figure 1:
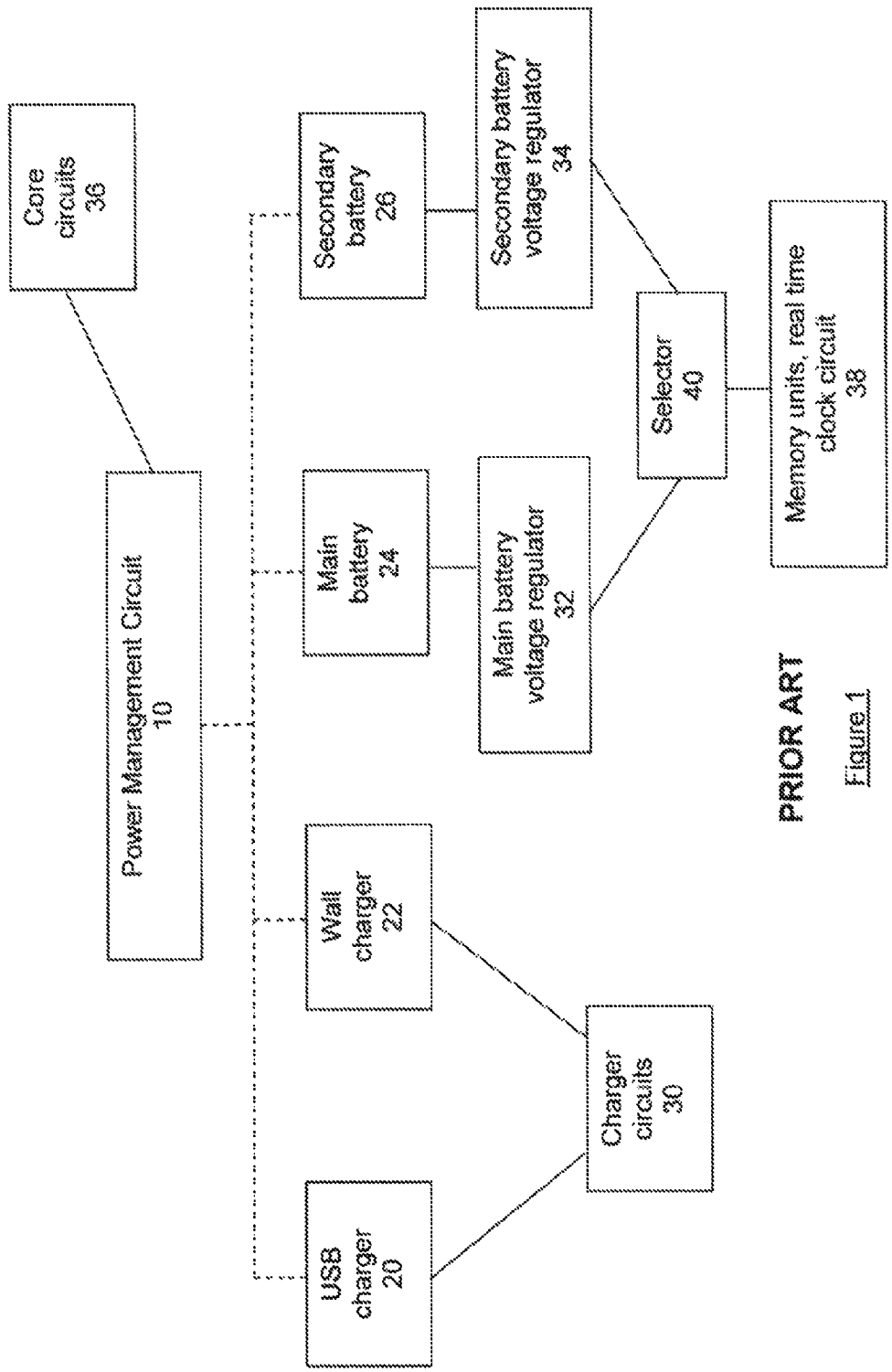
FIG. 1 is a block schematic diagram of a power management circuit of the prior art.
Figure 2:
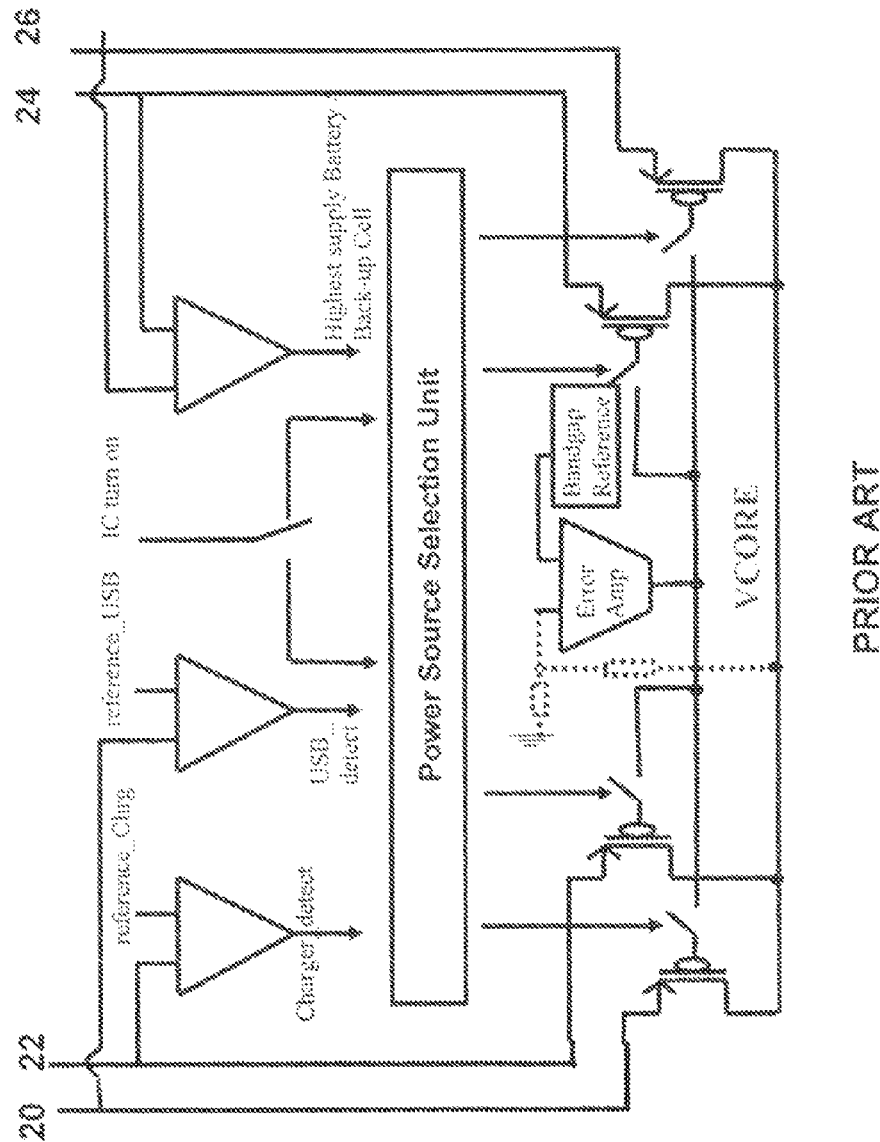
FIG. 2 is a block schematic diagram of an improved power management circuit according to the prior art.

According to an embodiment of the invention there is provided a power management arrangement for a mobile device comprising a digital circuit block and an analog circuit block, the power management arrangement being arranged to supply a first voltage to the analog circuit and a second voltage to the digital circuit. The power management arrangement comprises: an input unit adapted to receive input voltages from a plurality of power sources; a first voltage regulator coupled to the input unit and for supplying the first voltage; a second voltage regulator for supplying the second voltage and arranged to be selectively coupled to one of the first voltage regulator and input unit; and control logic adapted to select which of the received input voltages from the plurality of power sources provides power to the first and second voltage regulators, and to determine the magnitude of the first and second voltages supplied by the first and second voltage regulators.

This arrangement of a first voltage regulator selectively coupled to the second voltage regulator provides a dual stacked voltage supply unit, that is, the voltage regulators are arranged in series, thereby allowing drive voltages for the digital and analog circuits to be supplied separately and at different levels. This means, for example, that the digital circuits are not limited by the high voltage requirements of the analog circuits. Furthermore, only a very low quiescent current is consumed when the device is in an off-mode thereby extending battery life.

This is achieved by turning off the first voltage regulator and programming the second voltage regulator to "hibernate", that is, set to a minimal power consuming mode. The dual stacked arrangement provides a good PSRR (power supply rejection ratio) performance, especially for the second voltage (for the digital circuits). This is because when the device is in the "on" mode, the second regulator itself is powered by the regulated voltage provided by the first regulator, thereby providing enhanced PSRR performance. Hence, the second voltage (digital voltage) is less sensitive to transients on the power supply. The term voltage regulator means any arrangement that can control an output voltage provided by the arrangement. Mobile device may be considered to mean any portable device such as a handheld or mobile telephone, a personal digital assistant (PDA), a portable computer, a portable television, or other device.

As a result of having two voltages, one for digital circuits and one for the analog circuits, the digital components can use a lower voltage and hence have lower power requirements. This means they can be made smaller as they do not need to support such high voltages. The present solution is therefore optimised for dual oxide sub-micron technologies by using different oxides for the lower voltage digital circuits compared to the analog circuits.

The control logic may be adapted to select which of the received input voltages from the plurality of power sources provides power to the first and second voltage regulators based on a level of each of the received input voltages from the plurality of power sources, and on the operating state of the device such as whether it is switched on, switched off, or is charging. The control logic may be further adapted to set the magnitude of the first and second voltages provided by the first and second voltage regulators according to at least one of: an operating state of the device, and the level of each of the received input voltages available from the plurality of power sources. This ability to set the magnitude of the voltages means that if power is available from certain sources, or the mobile device is substantially inactive, lower voltages can be supplied thereby optimising battery life.

The control logic or input unit may comprise a comparator arranged to compare the levels of the received input voltages in order to determine the received input voltage having the highest level.

The first voltage regulator and second voltage regulators are supplied by the input unit wherein, the first and second voltage regulators and control logic are arranged such when the second voltage supplies the second voltage, the control logic can deactivate the first voltage regulator. This may be achieved by a first switch coupled in parallel with the first voltage regulator and between the second voltage regulator and the input unit, such that closing of the first switch deactivates the first voltage regulator. A second switch is also provided coupled between the second voltage regulator and the first voltage regulator. The first and second switches are operated in opposition such that when one switch is closed, the other switch is open. By the term switch we mean any device that can substantially turn on or off, i.e. activate a voltage and may include transistors or other circuit devices. The first and second switches may be controlled by the control logic.

The first voltage is not normally less than the second voltage. In one embodiment, the first voltage is 2.8 volts and the second voltage is 1.5 volts. In some circumstances, when the first switch is closed and the second switch is open, it is possible that the first voltage may be less than the second voltage. In this case, the second voltage will be powered by the input unit and not by the first voltage regulator.

If the operating state of the device is an off mode, that is the device is substantially inactive i.e. essentially in standby mode with only basic systems, such as clock and memory functions being powered, the control logic may instruct the input unit to draw power from the received input voltage having the highest magnitude. If the highest available received input voltage is provided by a power source internal to the device, the first voltage regulator draws no current from the input unit, and is set in by-pass mode, for example by closing the first switch to power the second voltage regulator with the input unit.

If the operating state of the device is an on mode, that is the device is fully operational, the control logic may instruct the input unit to take power from a predetermined one of the received input voltages. The predetermined one of the received input voltages may be provided by a battery.

The power management arrangement may further comprise a bandgap voltage reference. The bandgap voltage reference may be coupled between the output of the second voltage regulator and a ground voltage. The bandgap voltage reference may be merged with the second voltage regulator, and used as a reference voltage for the first and second voltage regulator. Whichever input supply is selected, the device will benefit from accurate supply voltage due to the use of the bandgap reference as a trimmed voltage reference.

The power sources may include two or more of: a main battery, secondary battery (e.g. button cell or coin cell), charger, and USB connection.

There is also provided a mobile device comprising the power management arrangement described above.

Figure 3:
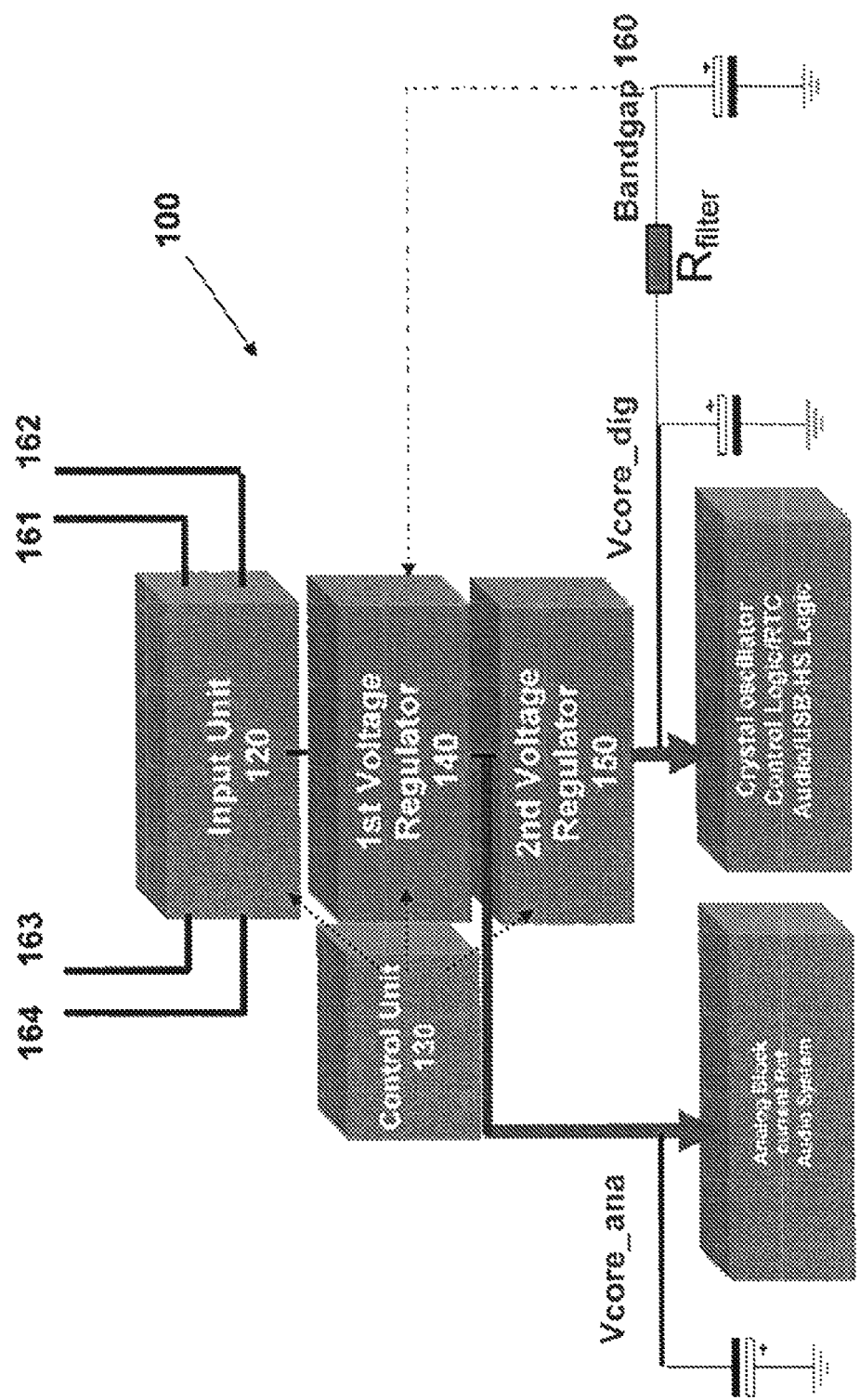
FIG. 3 is a block schematic diagram showing an overview of the power management arrangement in accordance with one embodiment of the invention

FIG. 3 shows a power management arrangement 100 for a mobile device in accordance with an embodiment of the disclosure. The power management arrangement 100 comprises an input unit 120, a control unit 130, a first voltage regulator 140, and a second voltage regulator 150. The input unit 120 is arranged to be able to receive voltages from a plurality of power sources 161, 162, 163, 164 and turn on the power source which is used for supplying power. The control unit 130 is coupled to the input unit 120, controls the voltages provided by the first and second voltage regulators 140, 150, and performs comparisons to determine which power source should be used. As discussed above, the prior art systems provide only one voltage and this is known as Vcore. The present embodiment uses dual oxide technology and thus the power management arrangement in accordance with the embodiment can provide optimised voltage supplies to the analog and digital circuit blocks, on the same IC. The first voltage is provided by the first voltage regulator 140, and the second voltage is provided by the second voltage regulator 150. The first voltage and second voltage have different magnitudes, the first voltage being higher than the second voltage. The first voltage regulator 140 supplies a first voltage for driving an analog circuit block including the analog circuits of the device. This voltage is referred to as Vcore_ana. The second voltage regulator 150 is used to supply a second voltage for driving a digital circuit block including the digital circuits of the device. This second voltage is referred to as Vcore_dig.

The power management arrangement 100 also includes a voltage reference 160 such as a bandgap voltage reference. This is provided coupled across the output of the Vcore_dig supply. In an embodiment, the second voltage regulator 150 is merged with the bandgap reference voltage 160. This arrangement reduces power consumption. The bandgap voltage reference may be used as a reference voltage for the first and second voltage regulators. The mobile device will benefit from accurate supply voltage, whichever input power source 161-164 is selected, due to the use of the bandgap reference. The bandgap reference voltage is used as a trimmed voltage reference.

The power management arrangement 100 is adapted for use in a mobile device such as a mobile telephone. The description that follows is based on the use of the arrangement in such a mobile device. However, this use is exemplary and is provided to aid understanding. It will be appreciated that the arrangement may also be used in many other applications where multiple power sources are available.

In a mobile device such as a mobile telephone, the plurality of power sources may include a main internal battery 161, a secondary internal battery 162 (such as a button cell or coin cell), a battery charger 163 (for example, powered by mains electricity), and a USB connection 164. These power supplies are able to supply different voltages but are not all available for all of the time. It is desirable to control which of the power supplies is used to power the device in order to optimise battery lifetime.

In the mobile device, the first voltage regulator 140 provides the voltage Vcore_ana. This voltage is used to power the analog circuits such as the audio system which can require large voltage swings. The second voltage regulator 150 provides the voltage Vcore_dig. This voltage is used to power the digital circuits such as the crystal oscillator circuit, various control logic, the real time clock (RTC) and USB logic.

The input unit 120 detects the voltages available at each power source and the control unit 130 performs comparisons to determine which of the power sources is able to supply the highest voltage. Once the power source that is able to supply the highest voltage has been selected, power is provided through the input unit 120 to the voltage regulators 140, 150. By providing the supply voltages through the input unit 120, reverse current flow between the power sources is prevented. For example, without the input unit, a relatively high voltage level supplied as an output Vcore might be higher than the voltage available from the button cell 164 which, in some configurations, might result in a reverse current flowing through the button cell 164 thereby degrading the performance of the button cell.

The control unit 130 is coupled to the input unit 120 and controls the magnitude of the voltages output from the first and second voltage regulators 140, 150 depending on the operating state of the mobile device and the level of each of the received input voltages from the power sources 161, 162, 163, 164. The control unit 130 is also arranged to select one of the power sources for providing power to the mobile device according to selection rules which will be described in more detail below. This allows the control unit 130 to optimise the current budget depending on the state of the device. Any switching from one power source to another by the control unit 130, perhaps as a result of changing demands of the device, is smoothed by using a switched capacitor technique which moves voltages by using non-overlapping signals to switch the voltage across one or more capacitors to a load. Since the signals do not overlap, the transition from one voltage to another can be made smoothly. In an embodiment, the control unit 130 includes NMOS logic circuitry.

Since the control unit 130 determines which of the available power sources 161-164 is used to supply power based on the voltages available, and also the demands of the device, there is no need for additional accessories detection circuits. For example, if the control unit 130 is already monitoring the voltage at the USB connection and battery charger input, and determines there is a voltage available, then the USB or charger are deemed to be present.

Although we have described the detection and monitoring of voltages provided by powers sources as being performed by the control unit these may instead be sensed by the input unit, and signals provided to the control unit. However, in another embodiment all detector and monitoring processes may be performed by the control unit, and the input unit may consist only of terminals for connection to the power sources.

Figure 4:
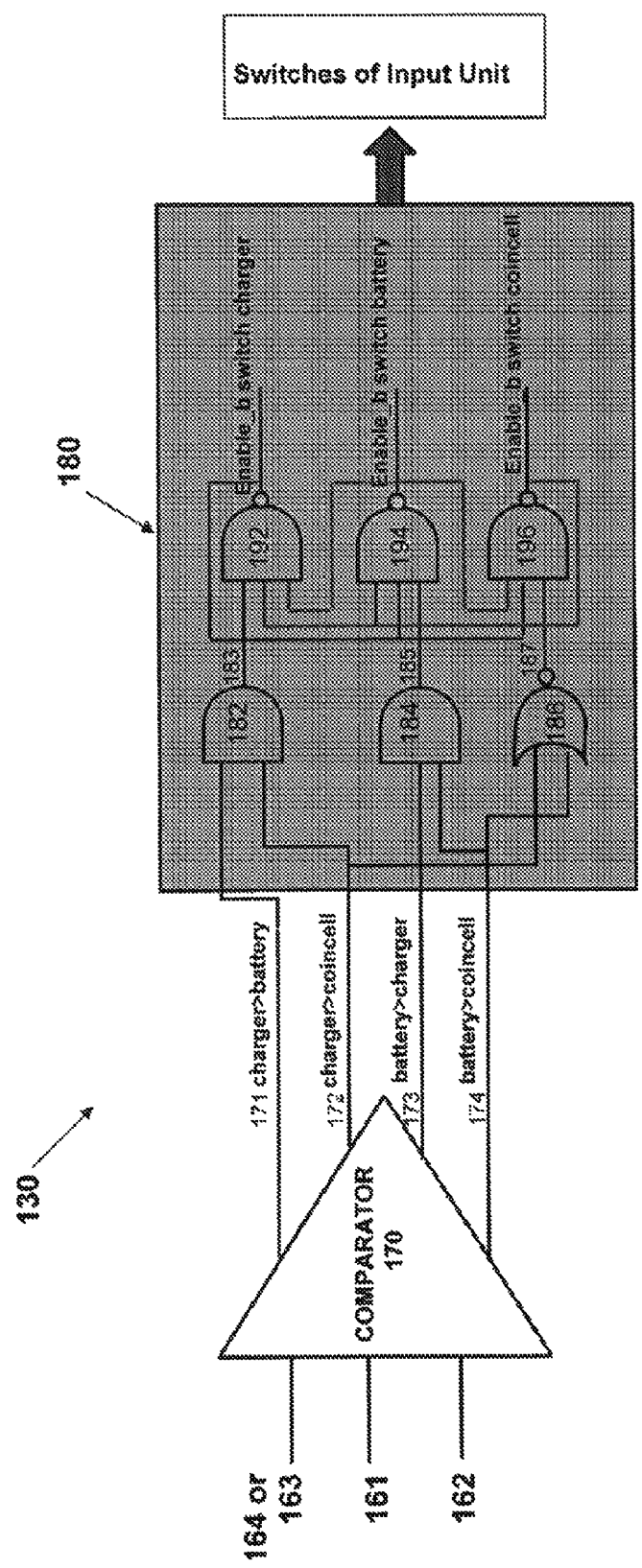
FIG. 4 is a schematic diagram showing the logic circuits used to implement the input unit of FIG. 3.

FIG. 4 shows in greater detail an exemplary implementation of logic circuits used in the implementation of the control unit 130. The control unit 130 receives as inputs the voltages provided by the battery, button cell, and a charger. The charger may be a wall charger or USB connection. For ease of illustration, FIG. 4 shows only one charger, but circuitry for both the USB charger and wall charger may be included. The input voltages are provided as inputs to comparator 170. The comparator has four outputs which can be set high or low. In an embodiment, the first output 171 from the comparator is set high if the voltage from the charger 163 is greater than the voltage from the main battery 161. The second output 172 from the comparator is set high if the voltage from the charger 163 is larger than the voltage from the button cell 162. The third output 173 from the comparator is set high if the voltage from the battery 161 is greater than that from the charger 163. The fourth output 174 from the charger is set high if the voltage received from the battery 161 is higher than that of the button cell 162. The four logical outputs from the comparator are provided as inputs to a series of logic gates in control block 180. The logic gates consist of two AND gates 182 and 184, a NOR gate 186, and three NAND gates 192, 194 and 196.

The first AND gate 182 receives the two outputs 171 and 172 from the comparator. The second AND gate 184 receives the two outputs 173 and 174 from the comparator. The NOR gate 186 receives the outputs 172 and 174 from the comparator. The output 183 provided by the first AND gate 182 is set high if the charger voltage is greater than both the battery 161 and button cell 162. The output 185 provided by second AND gate is set high if the voltage provided by the battery 161 is greater than both the charger 163 and button cell 162. Finally, the output 187 of the NOR gate 186 goes high if neither the charger voltage nor the battery voltage are higher than the voltage provided by the button cell 62, i.e. if the button cell has the highest voltage.

The final set of three gates are NAND gates 192, 194, and 196. Each of these receive as inputs one of the outputs from either of the AND or NOR gates 182, 184, 186. Each NAND gate also receives as inputs the output signal from the other two NAND gates. This provides each NAND gate with three inputs. The NAND gates compare the inputs to ensure that only one of the power sources supplies a voltage at any one time. In one embodiment, the switches to enable power to be drawn from each of the charger, battery, or button cell are implemented in PMOS. Thus, when the result of the comparison by a NAND gate is low, the enable switch is turned on. To avoid overlap of power supplies, the enable_b switch for the charger, shown in FIG. 4, will be low only if the enable_b switches of the battery and button cell are high indicating they are not selected. This operates as a check to ensure that only one of the power sources is supplying a voltage at any one time.

To summarise, the comparator 170 and control block 180 determine which of the three input voltages is the highest and provides a logic output indicating this.

Furthermore, the present invention employs a single input unit 120 which, in combination with the control block 130, determines the received input voltage having the highest level of all of the power sources. This is in contrast to the prior art which requires an input unit with a reference voltage for each power source, and hence draws more current and takes up more area on the semiconductor die or circuit board on which the power management arrangement is provided. The use of a single input unit also avoids transition issues associated with prior art devices, such as may occur when switching from one power source to another.

Figure 5:
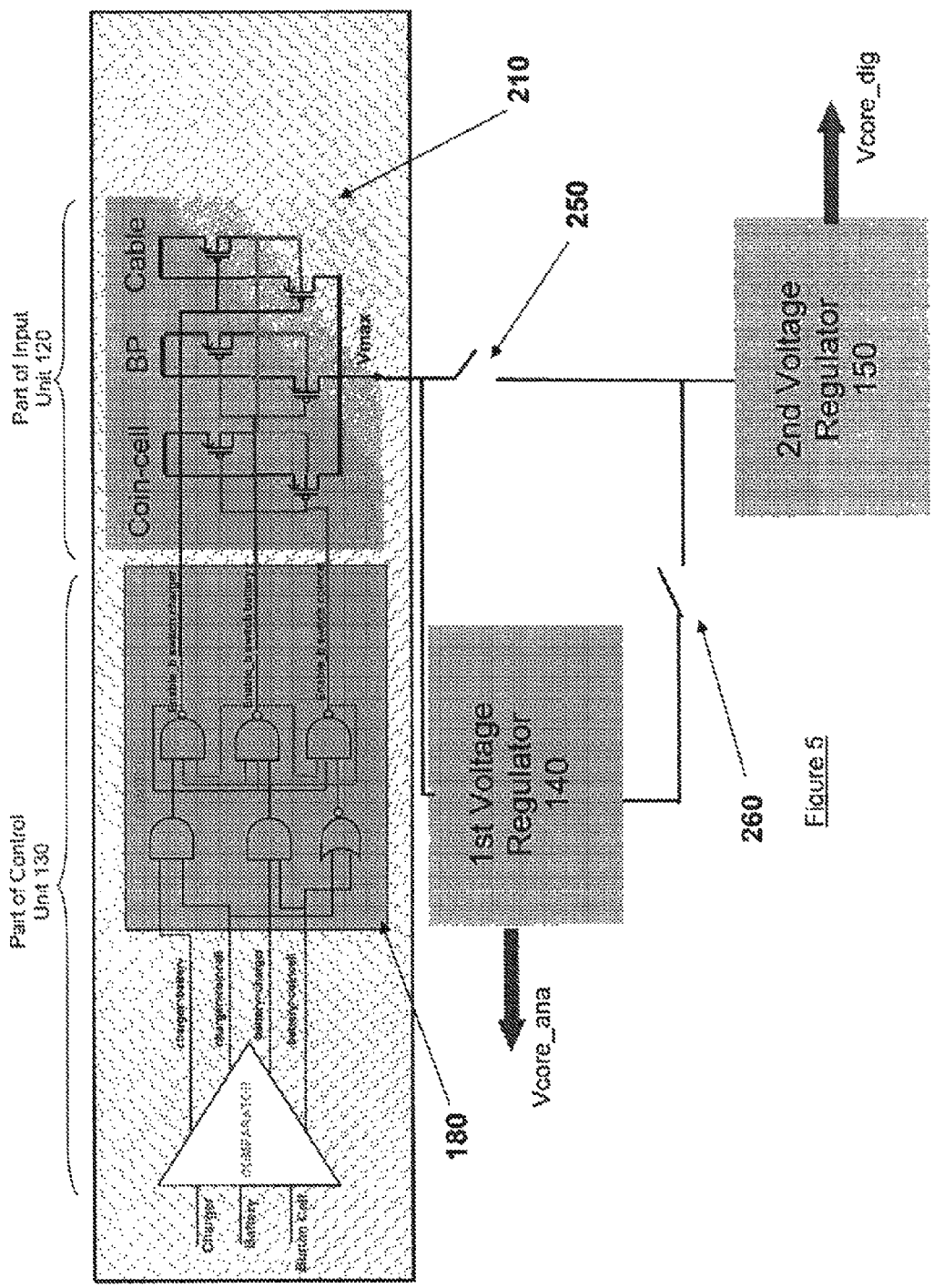
FIG. 5 is a block schematic diagram showing the logic circuits of FIG. 4 connected to the voltage generating and control systems of FIG. 3.

FIG. 5 shows schematically how the outputs from the control block 180 are used to provide the two voltages which are output by the first and second voltage regulators 140 and 150 in accordance with an embodiment of the invention.

The Figure shows that the outputs from the control block 180 are supplied to three pairs of transistors in block 210. Each pair of transistors is used as a switch to each of the power sources 161-164. The transistor block 210, formed in the input unit 120, receives the signals from the control block 180. In particular, the signal from each NAND gate 192, 194, 196 is respectively supplied to each pair of transistors controlling each of the power sources, such that only one of the power sources supplies a voltage at any time. The output voltage levels from each of the pairs of transistors are all connected to output rail Vmax.

Vmax is used to supply a maximum voltage to each of the first and second voltage regulators 140 and 150 as also shown in FIG. 5. The control unit 130 then determines the magnitude of the voltage to be supplied by each of the first and second voltage regulators 140 and 150. The arrangement of the voltage regulators 140, 150 in FIG. 5 shows two switches 250 and 260. The first switch 250 is provided between the input unit 120 and the second voltage regulator 150. The first voltage regulator 140 is provided in parallel with the first switch. The parallel path which includes the first voltage regulator also includes a second switch 260. The first 250 and second 260 switches are controlled by opposed signals such that the switches are not both in the closed (or open) position at the same time. The operation of the switches is as follows: when the first switch 250 is closed, the second voltage regulator 150 is powered and the regulated voltage Vcore_dig is provided by said regulator. In this state, the first voltage regulator 140 is in by-pass mode, so no current is supplied to it and hence, Vcore_ana is not supplied. Alternatively, by closing the second switch 260 and opening the first switch 250, the second voltage regulator 150 is powered by the first voltage regulator 140. Thus, the first voltage regulator 140 can be set to be in either i) by-pass mode (first switch 250 closed, second switch 260 open) such that Vcore_ana is not supplied and Vcore_dig is supplied by the second voltage regulator 150, or ii) the first voltage regulator 140 supplies (with first switch 250 open, second switch 260 closed) Vcore_ana which also powers the second voltage regulator 150 to provide Vcore_dig. In case (i), that the first voltage regulator is set in by-pass mode, the second voltage regulator draws current directly from the input unit 120 but in case (ii) the second voltage regulator is powered by the first voltage regulator. The switches are controlled by the control unit 130 and effectively allows the power management arrangement to have a by-pass mode in which the first power regulator is inactive.

The voltages provided by the first and second voltage regulators for powering the digital (Vcore_dig) and analog circuits (Vcore_ana) depend on the status of the mobile device, and will now be discussed.

Figure 6:
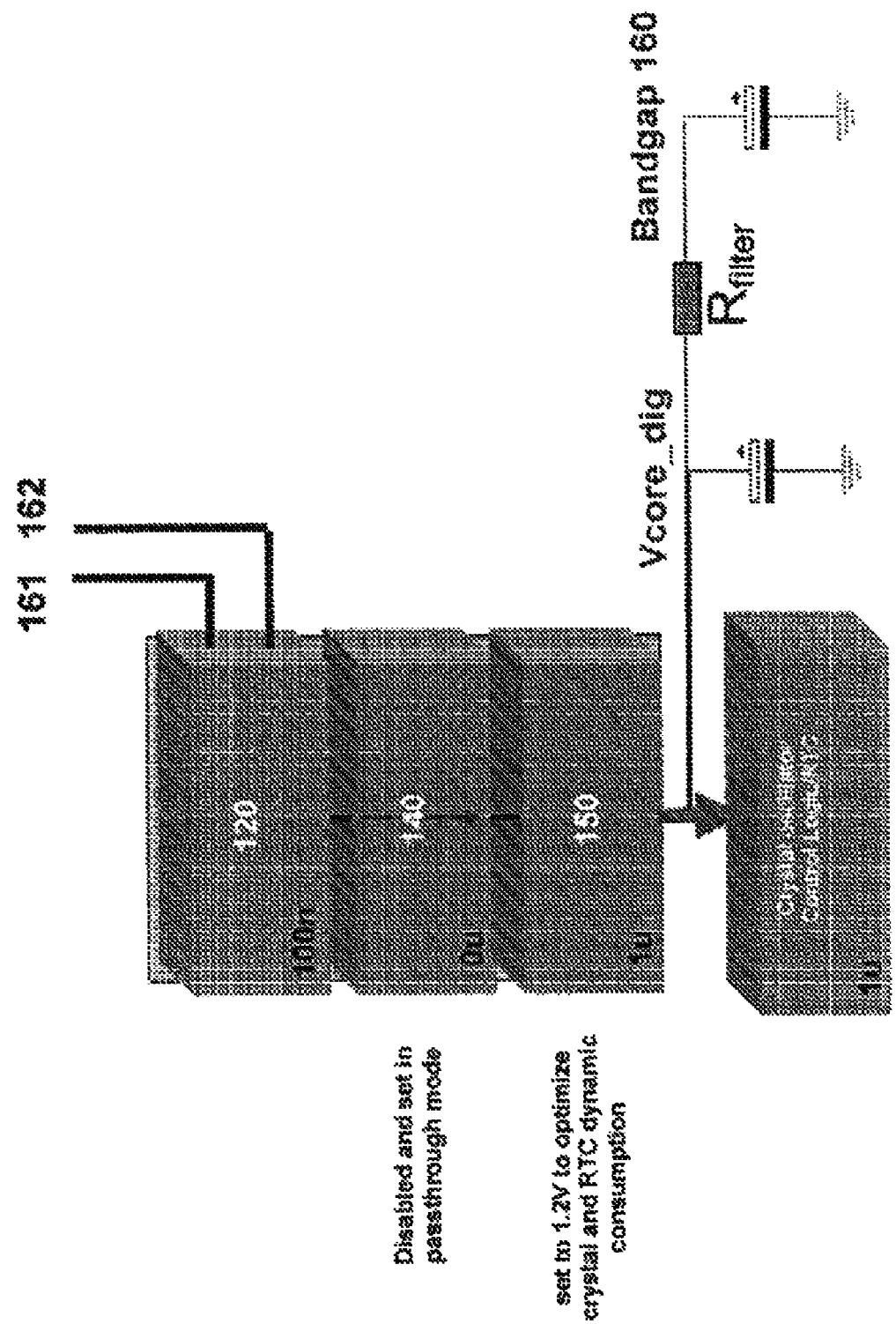
FIG. 6 is a schematic diagram showing the operation of the power management arrangement of FIG. 3 in an "Off" mode with no external charger fitted.

The mobile device in which the power management arrangement 100 is employed can be considered to have a number of operating modes with each mode having different power requirements. The first operating mode we shall consider is the "Off" mode. In this mode only minimal systems are operational, such as the clock, and if the charger is present charging circuits are also operational. Thus, the "Off" mode can be subdivided into two states: firstly when the USB connection or mains charger is present, and secondly when neither of these are present. We shall first consider the case when no charger or USB connection is present, as shown in FIG. 6. In this mode the input unit 120 detects that the battery 161 and button cell 162 are the only power sources available and that the USB connection and mains charger are not present since there is no voltage provided by them. The mobile device is in the "Off" mode so few of the mobile devices various systems are activated. For example, the backlight, LED matrix, microphone, speaker etc may all be inactive. As a result, the demands on the available power sources are relatively low. In the example shown in FIG. 6, the input unit 120 draws a small current in determining which power sources are available, this small current is around 100 nA.

As shown earlier in FIGS. 3 and 5, the first voltage regulator 140 is arranged for supplying the analog circuits in the mobile device, and the second voltage regulator 150 is arranged for supplying the digital circuits in the mobile device. Since in the "Off" mode, all of the systems on the analog circuits are switched off, the first voltage regulator 140 is disabled and set in by-pass' mode by closing the first switch 250 and leaving the second switch 260 open. In this state, the first voltage regulator 140 provides zero voltage and draws no current. The control unit 130 (not shown) sets the voltage provided by the second voltage regulator 150 to provide a lower than normal voltage to power only essential systems on the digital circuits, that is the second voltage regulator is set in "hibernate" state. The essential systems might include the crystal oscillator and real time clock (RTC). In the present case, this lower than normal voltage is set to 1.2 V as this is a minimum value for supplying the essential systems without affecting their operation. By using a minimum value, the lifetime of the power sources can be increased. In the embodiment shown in FIG. 6, the second voltage regulator 150 draws 1 μA and also supplies 1 μA to the digital circuits. The total current drawn in this state is 2.1 μA which is a low level for a quiescent current, and allows a increase in the lifetime of the battery and button cell.

Figure 7:
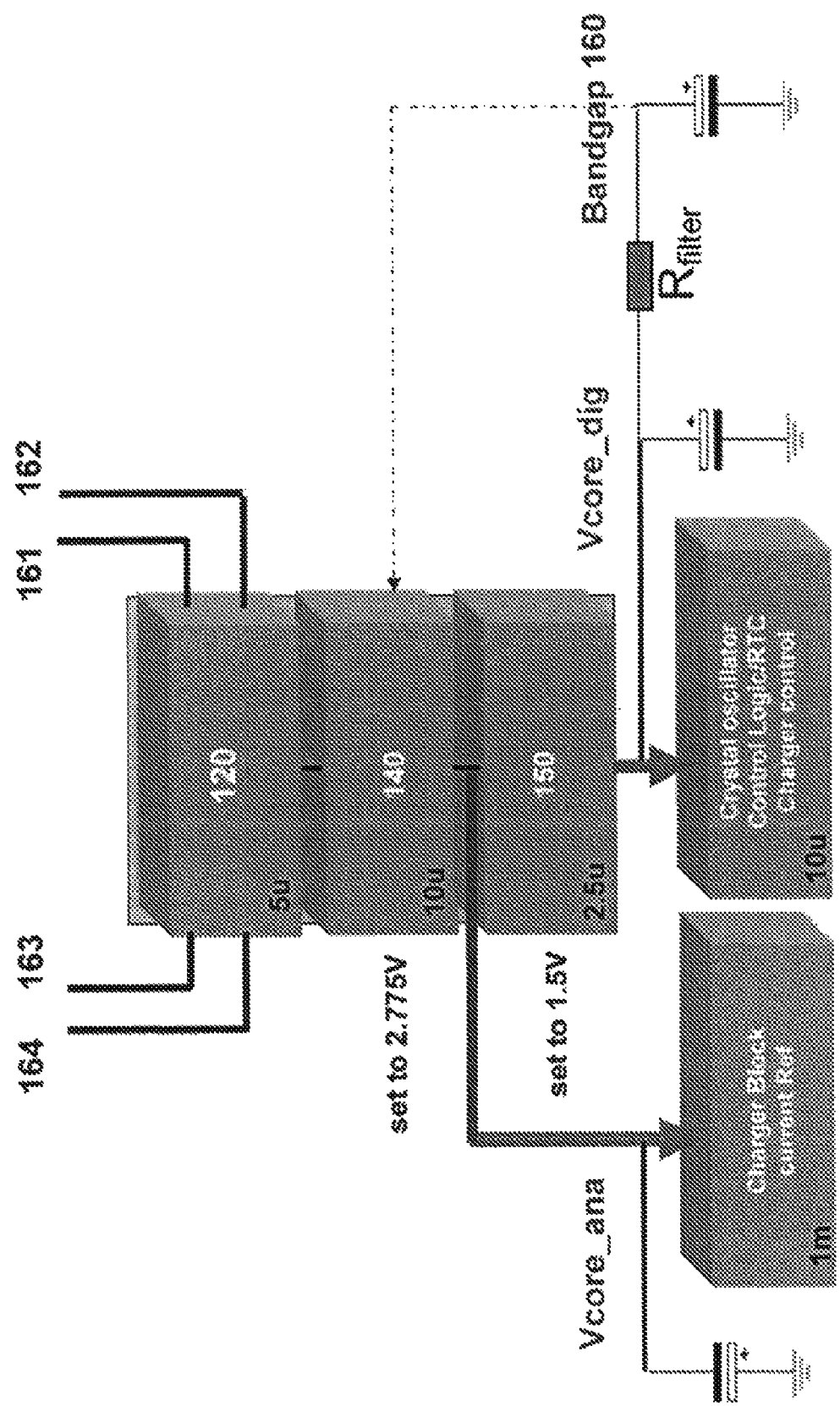
FIG. 7 is a schematic diagram showing the operation of the power management arrangement of FIG. 3 in an "Off" mode with an external charger fitted.

In the second operating state of the "Off" mode, the presence of the mains charger or USB connection and its ability to provide a voltage has been sensed by the input unit 120 as shown in FIG. 7. In this state, the charger supplies the power for the first and second voltage regulators 140, 150 and hence, for the analog and digital circuits. The charger also powers the input unit 120. In this state, again only essential systems are required to be powered. However, since the charger 163 is determined to be present, additional systems relating to charging of the internal battery 161 are also powered. This requires the first and second voltage regulators 140 and 150 to supply, under the control of the control unit 130, their normal operating voltages, which in the embodiment shown in FIG. 7, is 2.775V for the first voltage regulator 140 (which is supplied to the analog circuits), and 1.5 V for the second voltage regulator 150 (which is supplied to the digital circuits). In this configuration, the input unit 120 draws more current, in this case totaling 5 μA.

The first voltage regulator 140 itself draws 10 μA while supplying 1 mA to the analog circuits. The 1 mA supplied to the analog circuits is predominantly used to set current references to allow efficient charging of the main battery 161 and optionally, the button cell 162. Also in this embodiment, the second voltage regulator 150 itself draws 2.5 μA and supplies 10 μA to the digital circuits. In this state, the digital circuits that are powered include essential systems such as the crystal oscillator and real time clock, and additionally include charger control circuitry which may be used to monitor the charging status and current references used to charge the main battery 161. The total current drawn in this state has a typical value of around 1.03 mA when the maximum charging current is supplied to the internal battery, of which only 17.5 μA is drawn by the control systems of the input unit and first and second voltage regulators. These control systems are known as the core system.

In the "Off" mode, the power source having the highest available voltage is used to power the device.

A summary of which of the power supplies is used to power the device is provided in the truth tables shown below as Tables 3 and 4. In the tables, "X" and "1" have the same meaning as in the tables in the discussion of the prior art.

TABLE 3

TRUTH TABLE IN ON MODE

| CHARGER | VBUS | BATTERY | Back-up cell | Vcore powered by |
|---------|------|---------|--------------|------------------|
| X       | X    | 1       | X            | BATTERY          |

TABLE 4

TRUTH TABLE IN OFF MODE

| CHARGER | VBUS | BATTERY | Back-up cell | Vcore powered by |
|---------|------|---------|--------------|------------------|
| 1       | 1    | 1       | 1            | Highest of the 4 inputs |

Figure 8:
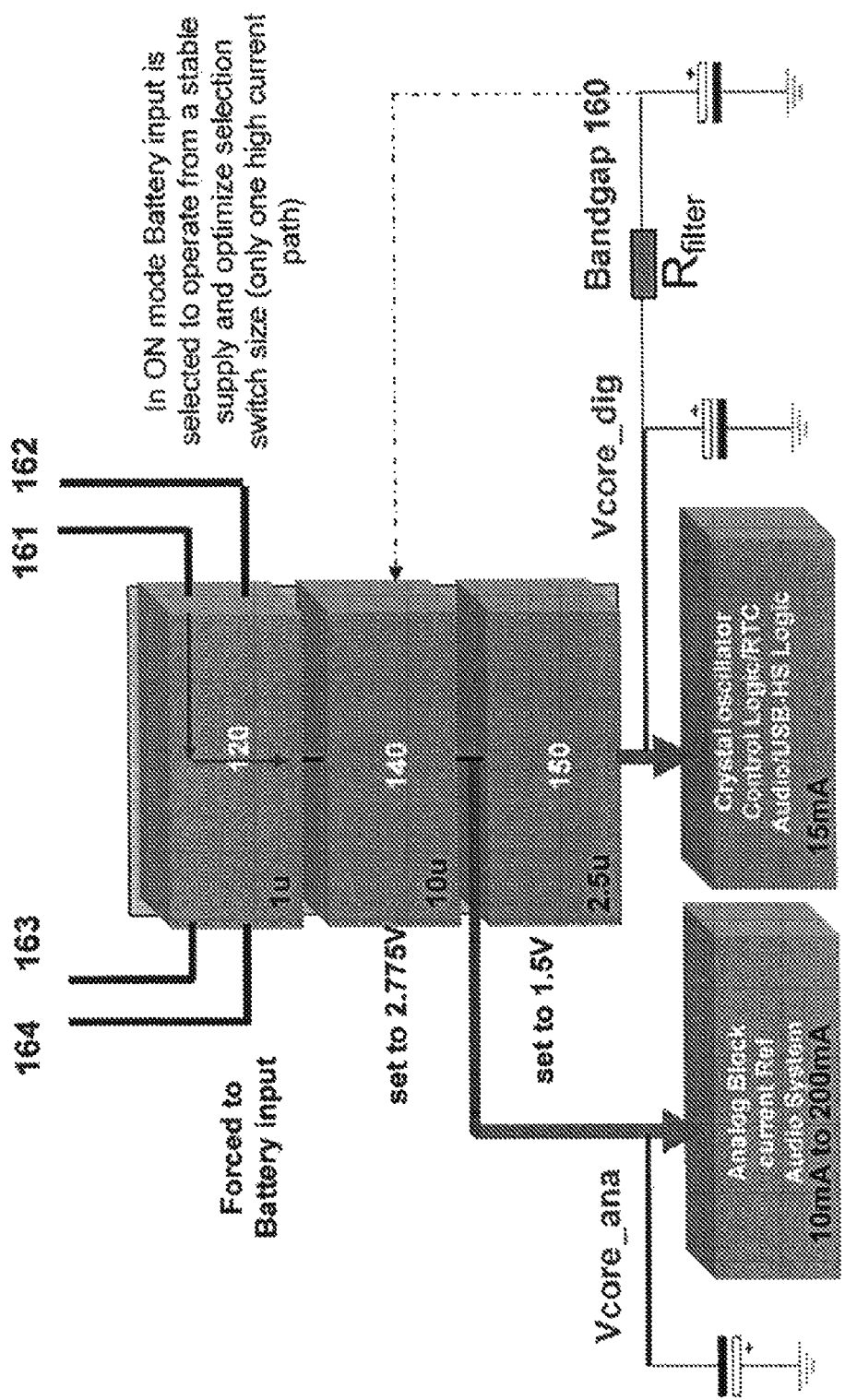
FIG. 8 is a schematic diagram showing the operation of the power management arrangement of FIG. 3 in an "On" mode.

The second operating mode of the mobile device is the "On" mode. In this mode the charger 163 or USB connection 164 may be present, and the main internal battery 161 is available as shown in FIG. 8. However, the input unit 120 does not need to sense the availability of power sources and determine which has the largest voltage available, because in an embodiment described herein, in the "On" mode power is always drawn from the main battery 161, as shown in the truth table of table 4. Thereby, the battery supplies a stable voltage level. This mode also draws more power than any of the other modes. By selecting that the "On" mode always draws power from the main battery, high current paths and regulators in the input unit 120 are only required in the path from the main battery 161. Hence, no high current components are required in the paths from the charger 163, USB 164, or button cell 162. This allows the physical size of the input unit 120 in the power management arrangement to be minimised.

In an embodiment, the control logic generates a signal indicative of whether the device is in the "Off" mode or the "On" mode. This signal is provided to the control unit 130 to set the output voltage levels and status of the first and second voltage generators 140, 150.

In the "On" mode the first voltage regulator and second voltage regulator supply their normal operating voltages of 2.775V and 1.5V. The first voltage regulator 140 draws 10 μA itself and supplies between 10 mA and 200 mA to the analog circuits depending on the exact status of the device. For example, the maximum current may be drawn when making a call, whereas the lower current may be drawn when the systems powered include the backlight, display, LED matrix, speaker etc. The second voltage regulator 150 draws 2.5 μA and may supply around 15 mA to the digital circuits. This may be used to power the essential systems such as the crystal oscillator and real time clock, and also audio systems and USB logic. The total current drawn depends on the status of the mobile device but may be as much as 200 mA or more. In standby mode, the core system consumes only 13.5 μA.

In the higher current consuming modes, for example the "On" mode, or the "Off" mode with the charger attached, when the Vcore_ana voltage provided by the first voltage generator 140 has reached a correct value as determined by an internal comparator, the second voltage regulator 150 is, as mentioned above, powered by the first voltage regulator 140. This dual stacked core supply architecture provides improved PSRR performance for Vcore_dig. This is because the second voltage regulator 150 is itself powered by the regulated voltage of the first voltage regulator 140 and so is less sensitive to any transient or noise on the power supply.

The power management arrangement 100 in accordance with an embodiment of the invention, is configured to provide two different supply voltages, primarily the analog and digital voltage rails Vcore_ana and Vcore_dig which have different magnitudes. This has the effect that the magnitudes of the supply voltages for both the analog and digital circuits are not constrained by each other and may be optimised for the respective circuits. For example, the greater voltage supplied to the analog circuits allows the audio circuits to supply a large voltage swing resulting in a high performance audio system, while the lower voltage digital circuits can be supplied with a lower required voltage which avoids the need for additional circuitry.

The present invention uses the input unit and control unit to actively determine the power source used and also to set the level of the two supply voltages, one to power digital circuits and one to power the analog circuits. By activating these circuits separately the voltage levels can be set independently for each circuit thereby allowing both the design of each circuit and performance of each circuit to be optimised. Furthermore, the incorporation of voltage comparisons into the input unit means that detection of accessories such as USB connection, charger etc is automatically performed further simplifying the design and reducing chip size. The ability to independently power the analog and digital voltage supplies also means that the "Off" mode quiescent current can be reduced to that required to power only the clock and memory units.

The present invention is applicable to many devices and not just mobile phones, but may be readily applied to cameras, laptops and other portable rechargeable mobile devices.

In the foregoing specification, the invention has been described with reference to specific examples of embodiments of the invention. It will, however, be evident that various modifications and changes may be made therein without departing from the broader scope of the invention as set forth in the appended claims.

The term "coupled," as used herein, is not intended to be limited to a direct coupling or a mechanical coupling. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

The invention claimed is:

1. A power management arrangement for a mobile device comprising a digital circuit block and an analog circuit block, the power management arrangement being arranged to supply a first voltage to the analog circuit block and a second voltage to the digital circuit block, the power management arrangement comprising:
   an input unit adapted to receive input voltages from a plurality of power sources;
   a first voltage regulator coupled to the input unit and for supplying the first voltage;
   a second voltage regulator for supplying the second voltage and arranged to be selectively coupled to one of the first voltage regulator and input unit; and
   control logic adapted to select which of the received input voltages from the plurality of power sources provides power to the first and second voltage regulators, and to determine the magnitude of the first and second voltages supplied by the first and second voltage regulators.

2. A power management arrangement as claimed in claim 1, wherein the control logic is adapted to select to which of the input unit and first voltage regulator the second voltage regulator is coupled based on an operating state of the mobile device.

3. A power management arrangement as claimed in claim 1, wherein the control logic is adapted to select which of the received input voltages from the plurality of power sources provides power to the first and second voltage regulators based on the operating state of the device and a level of each of the received input voltages from the plurality of power sources.

4. A power management arrangement as claimed in claim 1, wherein the control logic is adapted to set the magnitude of the first and second voltages provided by the first and second voltage regulators according to at least one of: an operating state of the device, and a level of each of the received input voltages from the plurality of power sources.

5. A power management arrangement as claimed in claim 1, wherein the control block comprises a comparator for comparing the levels of the received input voltages in order to determine the received input voltage having the highest level.

6. A power management arrangement as claimed in claim 1, wherein the first and second voltage regulators and control logic are arranged such that the control logic can deactivate the first voltage regulator.

7. A power management arrangement as claimed in claim 6, comprising:
   a first switch coupled in parallel with the first voltage regulator and between the second voltage regulator and the input unit; and
   a second switch coupled between the second voltage regulator and the first voltage regulator, the first and second switches controlled by control logic such that closing one switch and opening of the other switch deactivates the first voltage regulator.

8. A power management arrangement as claimed in claim 7, wherein the first and second switches operate such that when one switch is closed the other switch is open.

9. A power management arrangement as claimed in claim 1, wherein the first voltage is not less than the second voltage.

10. A power management arrangement as claimed in claim 4, wherein the control logic is arranged to instruct the input unit to draw power from the received input voltage having the highest level when the mobile device is substantially inactive.

11. A power management arrangement as claimed in claim 10, wherein when the highest available voltage is provided by a power source internal to the device, the first voltage regulator is disabled by operating a switch.

12. A power management arrangement as claimed in claim 4, wherein the control logic is arranged to instruct the input unit to take power from a predetermined one of the received input voltages when the mobile device is activated.

13. A power management arrangement as claimed in claim 12, wherein the predetermined one of the received input voltages is provided by a battery.

14. A power management arrangement as claimed in claim 1, wherein the power management arrangement is provided on a single integrated circuit.

15. A power management arrangement as claimed in claim 1, further comprising a bandgap voltage reference between an output of the second voltage regulator and a ground voltage.

16. A power management arrangement as claimed in claim 15, wherein the bandgap voltage reference is merged with the second voltage regulator.

17. An electronic device connectable to a plurality of power sources, said electronic device including a power management arrangement of claim 1.

18. An electronic device as claimed in claim 17, wherein the power sources include a main battery and a secondary battery.

19. A power management arrangement as claimed in claim 2 wherein the control logic is adapted to select which of the received input voltages from the plurality of power sources provides power to the first and second voltage regulators based on the operating state of the device and a level of each of the received input voltages from the plurality of power sources.

20. A power management arrangement as claimed in claim 2, wherein the control logic is adapted to set the magnitude of the first and second voltages provided by the first and second voltage regulators according to at least one of: an operating state of the device, and a level of each of the received input voltages from the plurality of power sources.

* * * * *